Nov. 7, 1933.                W. J. BUEHRING                1,933,841
                         CAM BRAKE FOR PUNCH PRESSES
                          Filed Feb. 6, 1932          2 Sheets-Sheet 1
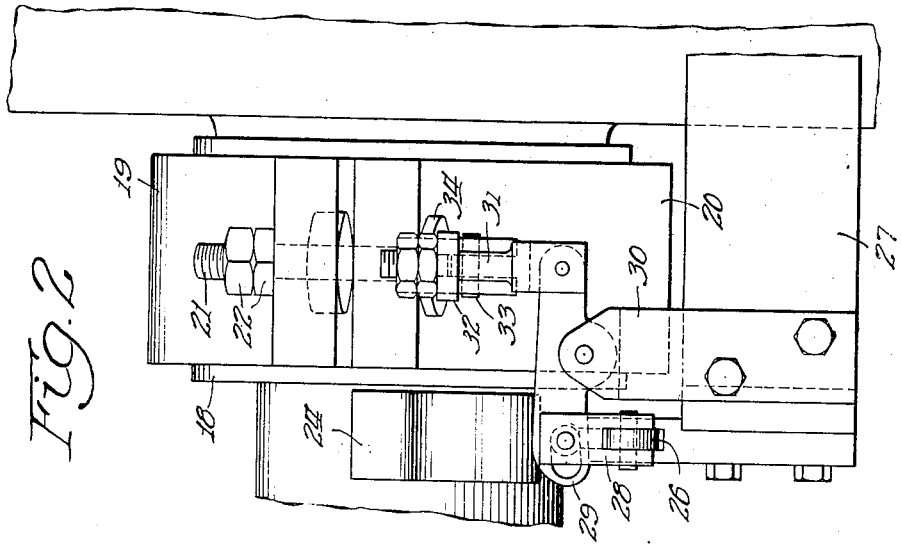
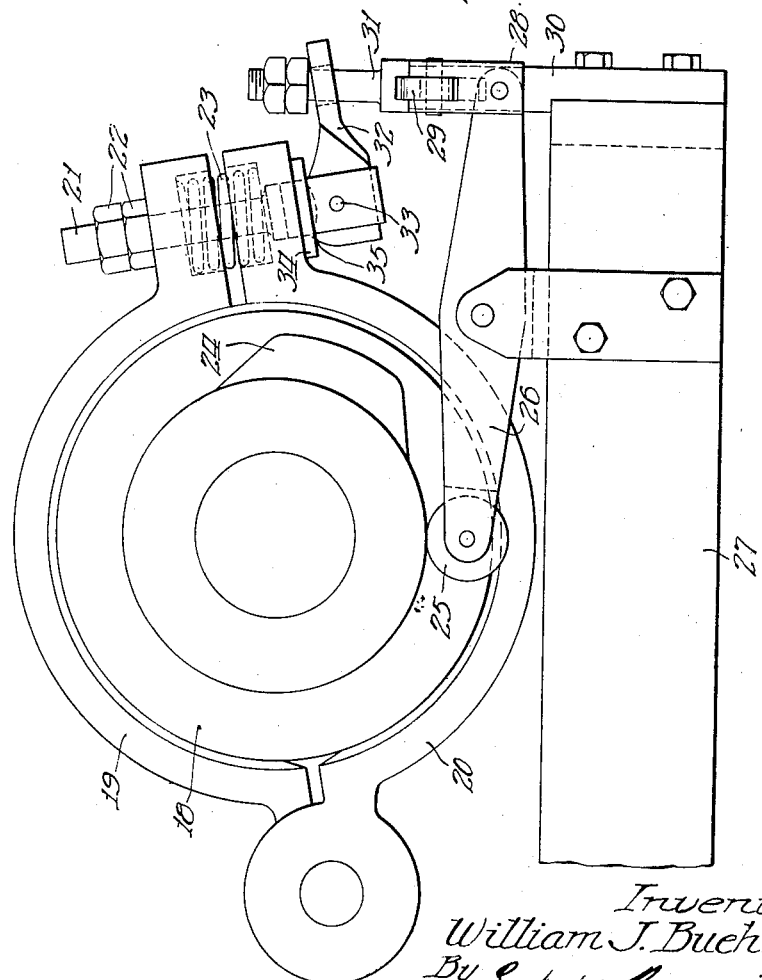
Inventor
William J. Buehring
By Jabez Banning
Attys

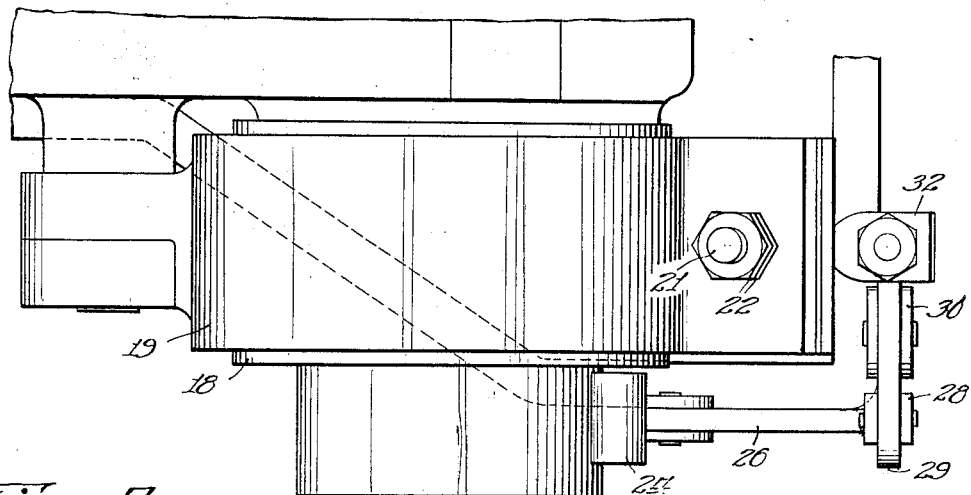
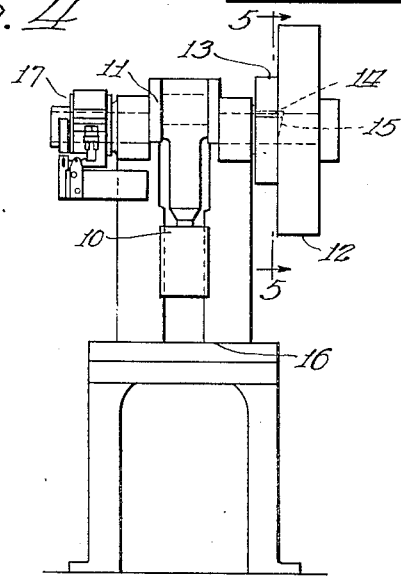
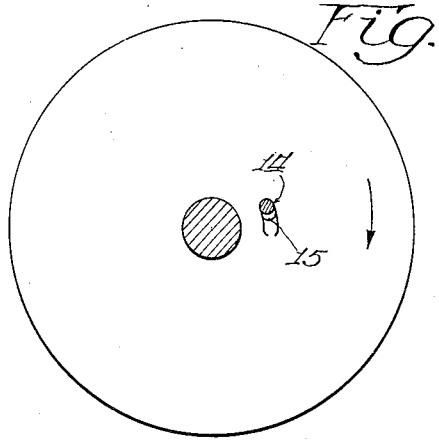
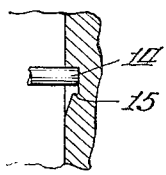

Patented Nov. 7, 1933

1,933,841

UNITED STATES PATENT OFFICE 1,933,841

CAM BRAKE FOR PUNCH PRESSES

William J. Buehring, Chicago, Ill., assignor to Reliable Electric Company, Chicago, Ill., a corporation of Illinois Application February 6, 1932. Serial No. 591,431

4 Claims. (Cl. 164—86)

My invention relates to punch presses and has for its principal object the provision of means whereby the ordinary punch press may be made to operate consinuously without danger of the rebound of the ram causing a jam in the operation.

In the usual punch press system, a driving means usually in the form of a fly wheel drives a crank shaft which in turn drives the ram. Usually there is a brake on the crank shaft which exerts a steady drag on the system so that the press will stop at the top of the stroke when the clutch pin is released. When the press is used continuously, this ordinary press fails to handle heavy work satisfactorily owing principally to the rebound of the ram when it hits the work. This condition is accentuated when dies are on springs. The clutch pin fits into the fly wheel with a certain amount of play and is pulled around by the back edge of the hole in the fly wheel. In the work stroke or down stroke of the ram, it is of course pulled forward by the fly wheel until it hits the work. When the ram hits the work, it springs up so fast that it tends to cause the crank shaft to overrun the driving or fly wheel; the clutch pin is thrown to the front edge of the hole in the fly wheel, and a shock is communicated to the feed mechanism which operates from the crank shaft. This shock of the ram gives a jerk to the feed mechanism and it occasionally results in failure to move the work the exact amount required. The result is a spoiled piece of work and a jam of the machine. The purpose of this invention is to provide means to prevent this overrunning of the ram due to its recoil from the work.

I will describe the preferred form of my invention by reference to the accompanying drawings wherein—

Fig. 1 is a side view of a portion of the braking mechanism on the crank shaft;

Fig. 2 is an end view of the mechanism shown in Fig. 1;

Fig. 3 is a top plan view of the braking mechanism;

Fig. 4 is a front view of a press embodying the invention;

Fig. 5 is a small section on the line 5—5 of Fig. 4; and

Fig. 6 is an enlarged fragmentary section through the fly-wheel showing the application of the clutch pin thereto.

Referring now in detail to the drawings, the punch press consists essentially of the ram 10 which is operated by a crank shaft 11 driven by means of the wheel 12 which is connected to the clutch member 13 of the crank shaft by means of a pin 14 and a slot 15.

Referring to Figs. 4 to 6 in particular, if the fly-wheel 12, as it is commonly called, is being driven in the direction indicated by the arrow in Fig. 5, pin 14 tends to ride down in the slot 15 against the back edge of this slot and thus turn the crank shaft with the fly-wheel. However, when the ram 10 hits the work which rests upon the bed 16, it tends to rebound suddenly from the work, and this rebound causes the crank shaft to overrun the fly-wheel 12 thus moving the pin 14 forward in the slot 15.

In order to overcome this backlash, I prefer to provide the mechanism indicated generally by the numeral 17 embodying the usual brake on the cam shaft. This brake as shown most clearly in Figs. 1 to 3 consists of the brake drum 18 on the crank shaft and the two brake shoes 19 and 20 engaging with the brake drum. These brake shoes are held together by means of the bolt 21, and their degree of braking may be varied by tightening the nuts 22.

Now in order to prevent the rebound of the ram and the crank shaft, I provide on the crank shaft a cam member 24 preferably so positioned that it strikes the roller 25 on the lever 26 just at the termination of the down stroke of the ram. Member 26, which is mounted upon the frame member 27 attached to the frame of the press at the end opposite the roller, is connected through a link 28 to the lever 29 which is also pivoted on the upright 30 attached to frame 27. This lever 29 at its opposite end is connected to a link 31 which link is connected to the cam member 32. This cam member 32, as shown, is pivoted in the end of the bolt 21 at 33 and bears against the brake shoe 20.

It is believed to be evident from an examination of Fig. 1 that a downward pull upon the link 31 would cause the cam face 35 of the member 32 to press upwardly against the washer 34 and thus force the two work shoes tighter together applying a sudden braking action to the crank shaft just at the termination of the down stroke of the ram. This sudden braking action overcomes the rebound of the ram and crank shaft and holds the pin 14 against the back of the slot 15.

It is obvious, of course, that this same system may be applied to tightening the brake at the top of the stroke so as to avoid the necessity of continuous braking which may be done by merely adding another cam similar to 24 to the crank shaft and using the same mechanism. This may be done either with or without the cam 24 as desired.

From the above description, it is believed that the construction and advantages of this device will be clear to those skilled in this art. It is also believed to be obvious that various minor modifications may be made without departing from the scope of the invention and hereinafter defined by the claims.

Having thus described one specific form of my invention, what I claim as new and desire to secure by Letters Patent is:

1. In a punch press, a reciprocating ram, a crank shaft for reciprocating said ram, drive means for said crank shaft, a brake for said crank shaft, a brake tightening device, and means actuated by said crank shaft at the end of the work stroke of said ram to operate said tightening device.

2. In a punch press, a reciprocating ram, a crank shaft for reciprocating said ram, drive means for said crank shaft, a pin and slot connection between said driving means and crank shaft, and means operable to prevent said pin from moving in said slot at the end of the work stroke of said ram.

3. In a punch press, a reciprocating ram, a crank shaft for reciprocating said ram, drive means for said crank shaft, a pin and slot connection between said driving means and crank shaft, and means operable to prevent said pin from moving in said slot at the end of the work stroke of said ram, said last named means comprising a cam on said crank shaft, and means operated by said cam to prevent the crank shaft from overrunning the driving means under the rebound of said ram.

4. In a punch press, a reciprocating ram, a crank shaft for reciprocating said ram, a drive means for said crank shaft, a cam on said crank shaft, and means operable by said cam to tighten said brake at certain desired positions of the stroke of said ram.

WILLIAM J. BUEHRING.